United States Patent [19]

Jackovich

[11] 4,023,637
[45] May 17, 1977

[54] PROGRAMMABLE ELECTRONIC TRACKING CONTROL FOR VEHICLES WITH HYDROSTATIC TRANSMISSIONS

[75] Inventor: Melvin Claude Jackovich, Stillman Valley, Ill.

[73] Assignee: Sundstrand Corporation, Rockford, Ill.

[22] Filed: Nov. 3, 1975

[21] Appl. No.: 626,157

[52] U.S. Cl. .............................. 180/6.48; 60/395
[51] Int. Cl.² ................. B62D 11/04; F15B 18/00
[58] Field of Search ............ 180/6.48, 6.5; 60/395, 60/420, 445, 490

[56] References Cited

UNITED STATES PATENTS

| | | | |
|---|---|---|---|
| 3,438,201 | 4/1969 | Nash | 60/395 |
| 3,848,690 | 11/1974 | Hawkins | 180/6.48 |
| 3,885,388 | 5/1975 | Crull | 180/6.48 X |
| 3,914,938 | 10/1975 | Cornell | 180/6.48 X |

Primary Examiner—Joseph F. Peters, Jr.
Assistant Examiner—R. Schrecengost
Attorney, Agent, or Firm—Ted E. Killingsworth; Michael B. McMurry; William R. Peoples

[57] ABSTRACT

In a vehicle wherein power is applied to each track or wheel through a hydrostatic transmission and control system including: a displacement control unit for regulating each transmission; a steering control valve associated with each displacement control unit for modifying the operation of the displacement control unit; and a speed and direction control unit for applying hydraulic pressure to each of the displacement control units for controlling the basic direction and speed of the vehicle; wherein the maintenance of the desired direction of operation of the vehicle is enhanced by an electronic tracking control circuit that includes: means for measuring the actual speed of each track; a phase comparator for providing a signal indicating the difference in track speeds; an integrator for providing a signal proportional to the difference in speed as measured over time; and comparator circuits responsive to the integrator for triggering a solenoid control valve connected between the appropriate steering control valve and displacement control unit to open, thereby reducing the speed of the faster moving track in order to maintain the desired direction of operation. Either a straight line or curved path of operation for the vehicle can be selected by adjusting bias voltages applied to the integrator. Additional circuitry is provided to deactivate the electronic tracking control when either of the steering control valves is actuated.

42 Claims, 7 Drawing Figures

FIGURE 1

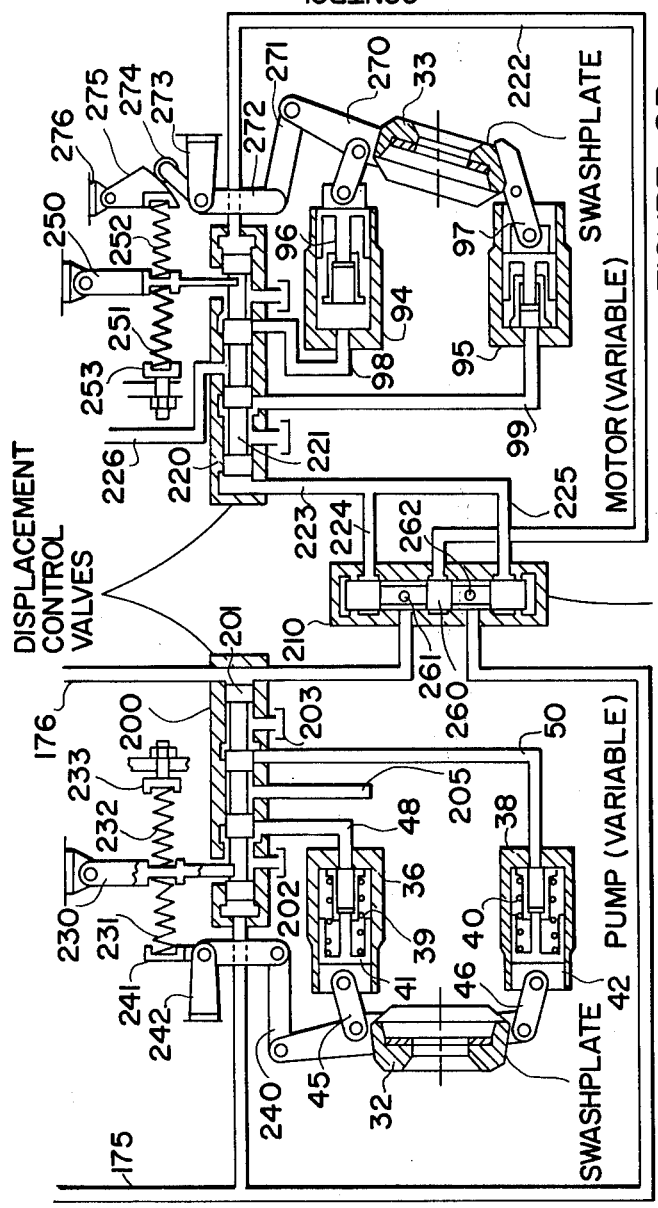

PROGRAMMABLE ELECTRONIC TRACKING CONTROL FOR VEHICLES WITH HYDROSTATIC TRANSMISSIONS

BACKGROUND OF THE INVENTION

The invention relates to control systems for hydrostatic transmissions for propulsion of vehicles and more particularly, to electronic means for maintaining a desired path or track of operation without operator intervention.

There are many circumstances under which it is highly desirable to have a hydrostatic transmission driven vehicle, such as a crawler tractor, operate in a straight line or in a predefined curve without driver intervention. For example, in farming or in various types of construction work, it is considered desirable to have a track vehicle maintain a straight path of travel with less than one foot of deviation in each 100 feet of forward or rearward movement. Predetermined paths of operation should be obtainable where the operator merely selects the speed and direction (forward or reverse) by operating a single speed and direction control lever.

However, in practice it has been found that in some types of hydrostatic transmissions, fluid leakages and slightly mismatched hydraulic components result in one track turning at a slightly higher velocity than the other. A number of hydraulic solutions to this problem have been proposed as illustrated in the U.S. Pat. Nos. to Burton, 3,789,940; Long, 3,543,654; and Lauck et al., 3,812,925. A hydraulic solution, however, calls for the use of relatively expensive and bulky hyraulic components which also require close tolerances for effective operation.

SUMMARY OF THE INVENTION

It is, therefore, an object of the invention to provide in a hydrostatic transmission control system, having a hydrostatic transmission for each wheel or track, an electronic control system for aiding in straight line operation wherein the speed of rotation of each wheel or track is measured and compared, and an electronic signal is generated, representing the relative difference in track or wheel speed, for activating valves to control the speed of rotation of one of the wheels or tracks in order to maintain the desired path of operation without operator intervention.

It is a further object of the invention to provide an electronic tracking control system for use with hydrostatic transmissions that include a hydrostatic pump and motor for each transmission wherein the hydrostatic transmission control system further includes a displacement control unit for controlling both the displacement of the pump and the displacement of the motor, wherein the electronic control measures the speed of rotation of each of the wheels or tracks and generates a signal, representing the difference, which is utilized to control a valve associated with each displacement control unit in order to regulate the speed of the faster moving wheel or track.

It is an additional object of the invention to provide in a vehicle control system having: hydrostatic transmissions, consisting of a hydraulic pump and motor for delivering power from a prime mover to each track or wheel; a displacement control unit for each pump and motor for regulating both the amount of hydraulic fluid delivered by the pump to the motor and the direction of fluid delivery along with the displacement of speed of the hydraulic motor; a speed and direction control unit for providing hydraulic signals to each of the displacement control units, indicating the direction and speed desired; and steering control valves associated with each displacement control unit for individually regulating the speed and direction of each track, wherein the desired path of operation of the vehicle without operator intervention is enhanced by an electronic tracking control system which utilizes: magnetic pick-up units (MPU's) for measuring the speed of rotation of each track or wheel; a phase comparator circuit for generating a signal indicating the difference in speed of the tracks; and integrator circuit for integrating this difference signal over time; and comparator circuits responsive to the integrator for activating solenoid valves associated with each displacement control unit in order to maintain straight line operation.

It is yet another object of the invention to provide a vehicle control system having a hydrostatic transmission for controlling each of the tracks or wheels where each of the transmissions is controlled by a displacement control unit which in turn responds to a speed and direction control unit that provides hydraulic signals indicating the basic speed and direction of vehicle operation desired, along with steering control valves associated with each transmission for individually regulating the speed of each track or wheel wherein straight line operation without operator intervention is facilitated by an electronic tracking control which measures the speed of rotation of each of the tracks or wheels and generates a signal utilized to control solenoid valves associated with each displacement control unit wherein the electronic track control additionally includes circuitry responsive to each of the steering control valves for deactivating the electronic tracking control when either of the steering valves is being utilized; also included is a delay circuit which delays the operation of the electronic tracking control circuit a predetermined time after either of the steering control valves has been utilized.

A typical hydrostatic transmission control system, with which the electronic tracking control can be used, is disclosed in the U.S. patent to Crull, U.S. Pat. No. 3,885,388. In such a control system for a tracked vehicle, power is delivered from the prime mover, such as a diesel engine, to each track through a hydrostatic transmission. The hydrostatic transmission is normally composed of a hydraulic pump and motor. The hydraulic pump is driven by the prime mover and the amount and direction of hydraulic fluid delivered from the pump to the motor is controlled by a displacement control unit. The displacement control unit also controls the displacement of the motor, i.e. the amount of hydraulic fluid required to cause the motor to make one revolution. Therefore, by controlling the amount and direction of fluid delivered by the pump to the motor along with the motor's displacement, both the direction and speed of rotation of the motor can be controlled. Each displacement control unit is in turn responsive to a speed and direction control unit. Normally, a single lever is utilized to govern the hydraulic output signal of the speed and direction unit. Essentially, the speed and direction control unit delivers, by means of hydraulic conduits, a direction and displacement pressure to each of the displacement control units that in turn causes the transmissions to drive the tracks or wheels in the desired direction and at the desired speed. In addition, the hydrostatic control system also includes steering valves for each of the transmissions. Typically, these steering valves are inserted in the hydraulic circuit between the speed and direction control unit and each of the displacement control units. They serve to further regulate the hydraulic signal to the displacement control valves in order to make it possible for an operator to directly control the speed and direction of each track or wheel. Thus, an operator, by utilizing the single lever of the speed and direction control unit, can select the basic speed and direction of travel of the vehicle while at the same time, by utilizing the steering control valves can, by regulating the speed and direction of each track individually, turn or otherwise manuever the vehicle.

The electronic tracking control system is utilized in conjunction with the hydrostatic control system in order to provide for straight line or a predetermined curved path of operation of the vehicle when neither of the steering control valves are actuated by the operator. The electronic control includes a magnetic pick-up unit for each track which generates a signal indicating the speed of rotation of that track. A phase comparator compares the signals from the magnetic pick-up units and generates a signal that represents the difference in speed of the two tracks. The signal from the phase comparator is then integrated over time by an integrator circuit which in turn is applied to a pair of comparator circuits. The comparator circuits respond to both the polarity and magnitude of the integrated difference signal to activate one or another of solenoid valves inserted between each of the steering control valves and displacement control units. When one track is turning faster than the other, the integrated difference signal will cause one of the comparators, when the signal reaches a predetermined value, to activate the solenoid valve associated with the faster moving track. The solenoid valves inserted in the hydraulic circuit between the speed control valve and displacement control unit of the faster moving track serve to bleed off pressure from the displacement control valve, thus slowing down the faster moving track.

Provision for programming a curved path or track of operation for the vehicle is accomplished by applying a bias voltage to the integrator. Biasing the integrator in this manner results in a relatively greater difference in the speed of one of the tracks with respect to the other to activate the solenoid valves. Thus, one of the tracks will move at a somewhat greater speed than the other, producing a curved path of operation.

In addition, the electronic tracking control circuit is responsive to the positions of each of the steering control valves. Displacement of either of the valves, for example, when an operator is turning a vehicle, will serve to deactivate the electronic control. The deactivation circuit zeros or clamps the integrator circuit to prevent the operation of the solenoid valves and to eliminate any charge or bias on the integrator that might tend to affect the subsequent operation of the electronic tracking control. This feature is provided in order to prevent the electronic control from opposing the desired turning operation. Also provided is a time delay within the deactivation circuit so as to delay the operation of the electronic control a short period of time, such as 1 second, after the operator has made corrections in the vehicle's path of travel.

BRIEF DESCRIPTION OF THE DRAWINGS

FIG. 2B is a detailed diagrammatic illustration of the upper displacement control unit of FIG. 1;

FIG. 3 is a graph illustrating the resulting speed and direction of operation of a hydrostatic transmission in response to positioning of the manual control lever;

FIG. 4 is a graph showing the staging action of the variable displacement pump and motor of a hydrostatic transmission;

FIG. 5 is a graph showing the desired linear relationship between control pressure and speed for a hydrostatic transmission;

FIG. 6 is a graph showing the desired non-linear relation between displacement of the motor with respect to the speed thereof in order to obtain the linear speed control pressure relation of FIG. 5.

DETAILED DESCRIPTION OF THE INVENTION

Figure 1:
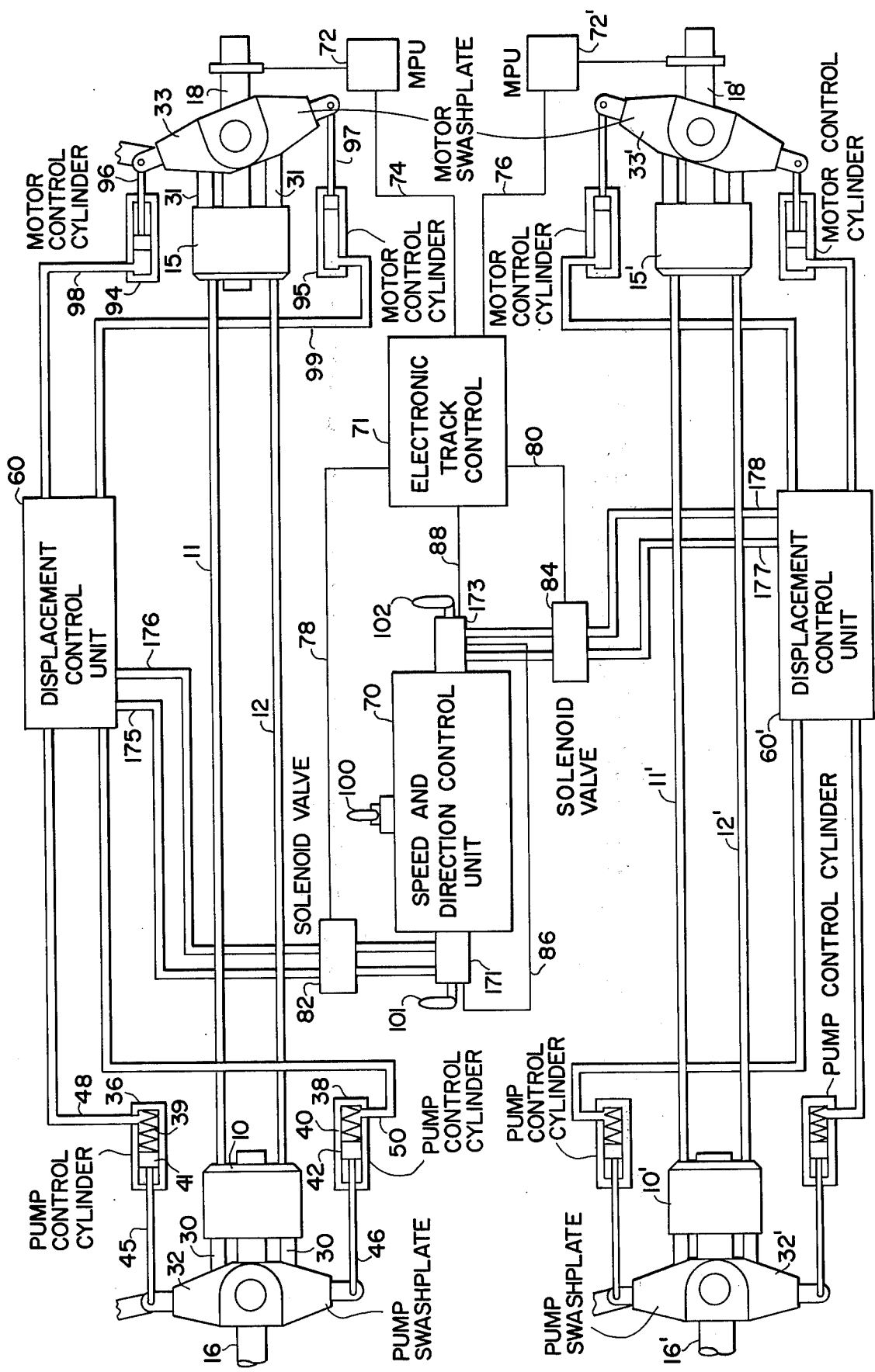
FIG. 1 is a diagrammatic illustration of a control system, including an electronic tracking control, for a vehicle equipped with two hydrostatic transmissions.

A dual path hydrostatic control system incorporating an electronic track control is shown in FIG. 1. A more detailed disclosure of the hydrostatic control system is presented in Crull, U.S. Pat. No. 3,885,388, which is assigned to the assignee of this application. Typically, this type of control system can be used to individually operate each track of a dual tracked vehicle such as a crawler tractor. Referring to the hydrostatic transmission, illustrated in the upper half of FIG. 1, a variable displacement pump 10 is connected by a pair of lines 11 and 12 to a variable displacement motor 15. The variable displacement pump 10 has an input shaft 16 driven from a power source, such as a diesel engine, with the motor 15 having an output shaft 18 connectable to a drive train, such as, for example, a track or wheel of the vehicle.

Preferably, both the pump 10 and motor 15 are of the axial piston type have rotable cylinder blocks, each with a plurality of cylinders in annular array and with pistons 30 and 31, respectively, having ends reciprocable in the cylinders. The pump 10 has a variable angle reversible swashplate 32 engaged by the projecting ends of the pistons 30 for initially controlling the speed of the transmission as well as the direction of rotation thereof. The motor 15 has a variable angle swashplate 33 movable from a maximum displacement position shown to a minimum displacement position somewhat greater than zero. The swashplate 33 engages pistons 31, causing reciprocation thereof and rotation of the cylinder block and the output shaft 18 of the motor connected thereto as high pressure fluid is supplied to the motor from the pump through conduits 11 and 12.

A pair of pump control cylinders 36 and 38 are provided for positioning the pump swashplate 32. Each has a spring contruction, indicated diagrammatically at 39 and 40, respectively, acting against pistons 41 and 42. The pistons 41 and 42 pivot the swashplate 32 through links 45 and 46 connected to the pistons. The control cylinders 36 and 38 position the swashplate in response to the supply of operating fluid to the cylinders by means of conduits 48 and 50, respectively. The centering springs 39 and 40 normally act through the pistons to position the pump swashplate as shown in its neutral position when no operating fluid is delivered through the conduits. In this position, there is no positive output from the pump. The control cylinders are of a conventional, single-action type so that the entry of fluid under pressure into one cylinder will cause the swashplate to tilt or pivot in one direction, and the influx of fluid under pressure in the opposite cylinder will cause reverse pivoting of the swashplate, thus permitting the flow of hydraulic fluid from the pump 10 to reverse, resulting in the reversal of direction of rotation of the motor.

The motor 15 has a pair of operating cylinders 94 and 95 containing piston and link elements 96 and 97 pivotally connected to the swashplate 33 and with conduits 98 and 99 connected to their respective cylinders for delivery of operating fluid thereto.

The second hydrostatic transmission, shown in the lower half of FIG. 1, is of the same construction as that just described. Corresponding structural elements of the second hydrostatic transmission have been given the same reference numeral with a prime affixed thereto.

In addition to the two hydrostatic transmissions, FIG. 1 illustrates in block form the relative location and function of the transmission control elements along with the electronic tracking control circuit. The pump control cylinders are connected to a displacement control unit 60 by means of the conduits 48 and 50. In addition, the motor control cylinders 94 and 95 are similarly controlled by the application of fluid pressure through the conduits 98 and 99. In this manner, the direction and output of the hydrostatic transmission is regulated by the displacement control unit 60.

The displacement control unit 60 is controlled through the application of fluid pressure through the conduits 175 and 176 for the upper transmission and conduits 177 and 178 for the lower transmission. The operation of the displacement control units 60 and 60' are basically governed by the speed and direction control unit 70 through the conduits 175, 176, 177 and 178. Normally, the single lever 100 is utilized to control both the basic speed and direction of movement of the vehicle. Movement of the lever 100 in a first direction will supply pressure in conduits 175 and 176 and conduits 177 and 178 in a manner to cause both hydrostatic transmissions in FIG. 1 to rotate in the desired direction at the desired speed. Along with the speed and direction control unit 70, the hydrostatic transmission control system of FIG. 1 also includes a left-steering control valve 171 and a right-steering control valve 173. Operation of these valves by means of the levers 101 and 102 modifies both the quantity and direction of fluid in lines 175 and 176 or the flow of fluid in lines 177 and 178, depending upon the lever used, so as to modify the operation of the displacement control units 60, thereby making it possible to directly control the direction of travel of the vehicle.

Included in the transmission control system of FIG. 1 is the electronic tracking control 71. Associated with and connected to each of the motor output shafts 18 and 18' is a magnetic pick-up unit 72. The magnetic pick-up units 72 and 72' generate signals on lines 74 and 76 that represent the speed of rotation of the individual vehicle tracks or wheels. Assuming straight line operation, whenever one of the vehicle's tracks is rotating faster than the other, the electronic tracking control 71 will generate a signal on line 78 or 80, depending upon which track is moving faster, to actuate one of the solenoid valves 82 or 84. The function of the solenoid valves 82 and 84 is to bleed or transfer the hydraulic fluid from line 175 to 176, or alternatively, line 177 to line 178, in order to cause the appropriate displacement control unit 60 or 60' to slow down the faster moving track. The electronic tracking control circuit is also responsive to switches in the steering control valves 171 and 173. Whenever one or the other of the steering control valves is actuated, signals produced on lines 86 and 88 serve to deactivate the electronic tracking control circuitry 71. Thus, the electronic tracking control circuit 71 will not interfere with any turning or maneuvering intentions on the part of the operator.

OPERATION OF THE HYDROSTATIC CONTROL SYSTEM

Figure 2A:
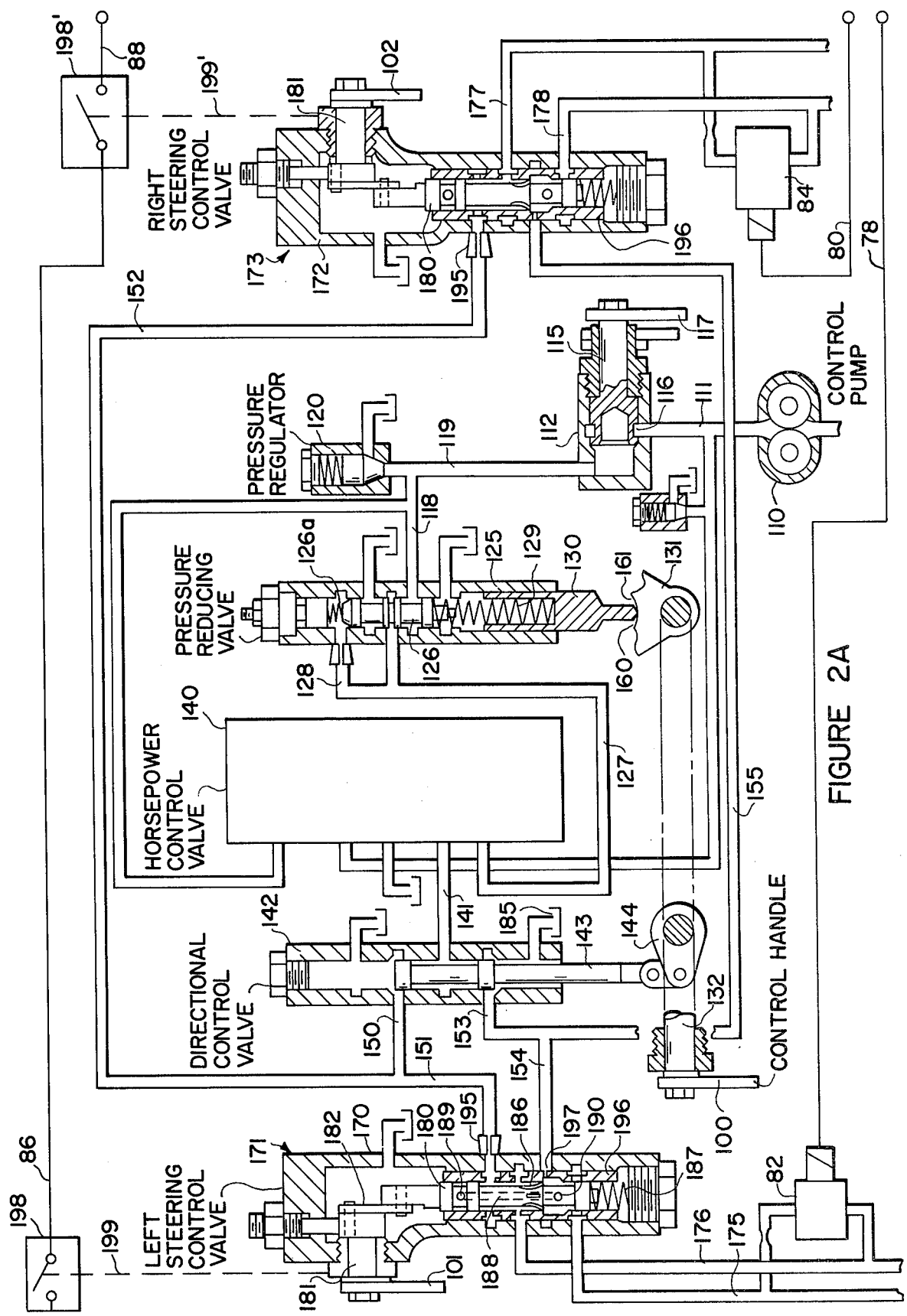
FIG. 2A is a detailed diagrammatic illustration of the speed and direction control unit of FIG. 1.

Details of the speed and direction control unit 70 are shown primarily in FIG. 2A, along with details of the steering control valves 171 and 173. The control unit 70 is operated by means of three control handles. The control handle 100 is operable to set the speed and direction of operation. The control handle 101 is operable to establish a modification in speed of one transmission or direction of operation thereof for steering capability in one direction of turn and the third handle 102 is operable to control the speed and direction of operation of the other hydrostatic transmission for steering capability in the other direction of turn.

The master control circuit of unit 70 includes a control pump 110 suitably driven by a prime mover, such as the engine of the vehicle, to deliver control fluid used to establish a control pressure for the system. The output of the control pump 110 is directed through a conduit 111 to a variable orifice valve 112 having a rotatable member 115 with a variable orifice 116. The position of this valve is set through a connection 117 to the throttle linkage of the vehicle's engine (not shown) to provide a pressure differential across the valve dependent upon the throttle setting of the engine and with the variable orifice opening varying directly relative to the throttle setting. The pressure differential is constant for each engine setting at rated speed. The valve functions to signal speed of the engine and, thus, if the engine speed decreases from that normally obtained by the throttle setting, there is a lowered output flow from the control pump 110 which results in a lowering of the pressure differential across the variable orifice. A conduit 119 extends from the variable orifice valve 112 in order to operate the control system, and further provides a regulated constant pressure in a conduit 118, and which is designated $P_R$. The conduit 118 extends to a pressure-reducing valve 125, with this valve functioning to establish a control pressure for obtaining a uniform speed control of both hydrostatic transmissions. The pressure-reducing valve 125 includes a valve spool 126 which controls communication between the inlet conduit 118 and an outlet conduit 127. The valve spool 126, at one end, is subjected to outlet pressure therefrom through a conduit 128 having a flow restriction as well as an adjustable spring 126a and, at the opposite end, is acted upon by a spring 129. The spring is partially positioned within a cylindrical member 130 movable within the housing of the valve and having an end engageable by a speed-setting cam 131 connected to a shaft 132 which is rotatably positioned by the manually operable handle 100.

The cam 131 has a pair of oppositely-inclined cam surface sections 160 and 161 extending upwardly in opposite directions from the neutral position of the cam which is shown in engagement with the member 130 in FIG. 2A. The control pressure fluid delivered from the pressure-reducing valve 125 by conduit 127 is directed to a horsepower control valve 140 which has, as a primary function, prevention of stalling of the vehicle's prime mover, and, thus, also may be referred to as an antistall valve. The specific construction of the anti-stall valve 140 forms no part of the present invention, and it has not been shown and described in detail. It may correspond with that shown and described in Crull, U.S. Pat. No. 3,855,388. A conduit 141 extends from the anti-stall valve to a directional control valve 142 having a valve spool 143 positionable by the manually operable handle 100. The position of the valve spool 143 determines the normal direction of operation of the hydrostatic transmissions.

The foregoing structure shown in FIG. 2A constitutes master control circuit of the speed and direction control unit 70 whereby positioning of the handle 100 determines the normal direction of operation and a basic common and uniform speed for the two hydrostatic transmissions. A first outlet conduit 150 from the directional control valve 142 branches into a pair of conduits 151 and 152 leading to the steering control valves 171 and 173 associated with each of the hydrostatic transmissions. A second conduit 153, extending from the directional control valve, has two branch conduits 154 and 155 also extending to the respective steering control valves. In the illustrated position of stem 143, line 141 is blocked and lines 150 and 153 are drained.

When the shaft 132 is rotated from the position shown in FIG. 2A by force applied to the handle 100, the valve spool 143 of the directional control valve is shifted from the position shown to direct control pressure fluid at a set pressure to one of the conduits 150 and 153. This serves to operate the transmisssions in one direction. The two sections 160 and 161 of the cam surface of cam 131 are mirror images of each other, whereby rotation of the shaft 132 in either direction will result in compressing of the spring 129 of the pressure-reducing valve 125 to a degree to set a control pressure of a desired value for speed of operation of the hydrostatic transmissions.

The branch conduits 151 and 154 from the master control circuit connect to the housing 170 of the left steering control valve 171, while the corresponding branch conduits 152 and 155 connect into the housing 172 of the right steering control valve 173. The steering control valve 171 has a pair of conduits, 175 and 176, extending therefrom to the displacement control unit 60 as shown in FIG. 1. The steering control valve 173 has a similar pair of conduits, 177 and 178, which extend to the displacement control unit 60' for the pump and motor of the other transmission. The steering control valves 171 and 173 are of the same construction, as are the displacement controls 60 and 60', and, therefore, the steering control valve 171 and the displacement control unit 60, shown in FIG. 2B for the transmission shown in the upper part of FIG. 1, will be described in detail with the understanding that it is of the same structure as the other displacement control 60'.

The control pressure signal is delivered to one or the other of the branch conduits 151 and 154, dependent upon the position of the directional control valve 142, with these conduits communicating with a bore in the valve housing 170 which movably mounts a valve spool 180. The position of the valve spool 180 is controlled by the handle 101, with the handle being connected to a rotatable shaft 181 which carries an eccentrically pivoted link 182 that is pivotally connected to the upper end of the valve spool 180. With the valve in the position as shown in FIG. 2A, and assuming control pressure is supplied to branch conduit 151, the fluid enters the valve bore; flows around a reduced portion of the valve spool; and then flows to the conduit 176 leading to the displacement control unit 60. This supplies full control pressure to the displacement control unit 60. Control pressure applied to the displacement control unit provides for operation of the associated hydrostatic transmission at a desired speed, as determined by the setting of the control pressure by the pressure-reducing valve 125.

To turn the vehicle in one direction, the speed of the hydrostatic transmission associated with one or the other of the steering control valves 171 and 173 is reduced. When, for example, the handle 101 is operated to move the valve spool 180 downwardly, as shown in FIG. 2A, a certain amount of the control pressure fluid is metered or bypassed to the branch conduit 154, which ultimately connects to a tank port 185 in valve 142. This serves to reduce the control pressure to the displacement unit 60 and thus reduces the speed of the transmission. This metering flow is across a land of the valve spool 180 which is provided with external slots 186 on the land that function as a variable orifice, with the slots effectively increasing in size as the valve spool 180 is lowered from the position shown in FIG. 2A, thus serving to gradually reduce the control pressure delivered through the conduit 176 to the displacement control unit 60.

The valve spool 180 has two limit positions, with the upper limit position as shown in FIG. 2A, and with the opposite limit position being in a full lowered position of the valve spool against the action of a spring 187 in the valve housing. In the fully-lowered position, there is a reversal of flow of the control pressure fluid with respect to output conduits 175 and 176 whereby direction of operation of the associated hydrostatic transmission is reversed. This reversal is accomplished by connecting an internal passage 188 in the valve spool 180 between the branch conduit 151 and the conduit 175 by means of a pair of radial openings in the valve spool which extend the internal passage 188 to the surface of the valve spool. These openings are indicated at 189 and 190. Thus, fully lowering the valve spool results in reversing the direction of operation of the associated hydrostatic transmission, making possible a spin-turn of the vehicle, with the vehicle turning about its axis between the two tracks.

If the directional control valve 142 is downshifted to obtain an opposite direction of operation of the hydrostatic transmissions, the pressure is supplied to the branch conduit 154 leading to the steering control valve 171; and in the position of the latter valve, as shown in FIG. 2A, full control pressure is delivered through the conduit 175 leading to the displacement control unit 60. Similarly, the control pressure can be reduced by metering or bypass as the valve spool 180 is lowered by the slots 186 on the land of the valve spool. The direction of track operation can be reversed by further downward movement of the valve spool 180 until the land having the slots 186 blocks the branch conduit 154 from the conduit 175, resulting in the control pressure signal being delivered to the conduit 176 to obtain the opposite direction of operation of the hydrostatic transmission.

The magnitude of control pressure reduction depends upon the relative size of an orifice 195 in the branch conduit 151 and the porting characteristics of the valve 171. A sleeve 196 positioned in the bore of the valve housing and which movably receives the valve spool 180 is provided with suitable flow passages and preferably an orifice passage 197 in communication with branch conduit 154 which reduces the tolerance effects of orifice size.

Associated with each of the steering control valves 171 and 173 are a pair of switches, 198 and 198', respectively. When the control handles 101 and 102 are in the neutral position, the switches are closed. The operative relationship of the switches to the control handles are indicated by the dashed lines 199 and 199'. By placing the handles 101 and 102 in neutral position, the switches 198 and 198' are closed, which is effective to transmit a positive voltage to the electronic track control circuit 71 of FIG. 1 over line 88. This will serve to activate the electronic track control for straight line operation.

FIG. 2B represents the upper 60 of the two displacement control units 60 and 60' where the conduits 175 and 176 extend from the steering control valve 171 connect into opposite ends of a displacement control valve 200. The pressure in conduits 175 and 176 results in the positioning of a control valve spool 201 within the housing of the valve 200. The control valve 200 additionally has a pair of tank connections 202 and 203, as well as connections to the conduits 48 and 50 leading to the pump control cylinders 36 and 38, as previously described. Operating fluid is delivered to the control valve through a conduit 205 which is supplied by a charge pump (not shown).

The swashplate 32 for the pump is shown in the centered position in FIG. 2B, resulting from the action of the springs 39 and 40 within the cylinders. Assuming that a control pressure signal directed to conduit 176 provides for operation of the hydrostatic transmission in a forward direction, the control pressure will shift the valve spool 201 to the left from the position shown in FIG. 2B, resulting in the flow of operating fluid from conduit 205 through conduit 48. This flow of fluid forces the piston 41 to move, thus shifting the swashplate 32. Alternatively, if the control pressure signal is delivered to conduit 175, the control pressure signal is applied to the left-hand end of the valve spool 201 to shift it to the right, as viewed in FIG. 2B, whereby operating fluid from conduit 205 is applied to the piston 42 to shift the swashplate in the opposite direction. The conduits 175 and 176, in addition to connecting into the control valve 200, extend to a shuttle valve 210. The shuttle valve 210 functions to port the highest control pressure existing in either of conduits 175 or 176 to one end of the displacement control valve for the swashplate 33 of the motor so that the motor swashplate 33 always adjusts in the same direction.

A control valve 220 of the motor displacement control has a valve spool 221, with the right-hand end thereof always being subjected to the highest control pressure through a conduit 222 extending from the shuttle valve 210. The opposite end of the control valve has a conduit 223 with branch conduits 224 and 225 connected to the shuttle valve 210. The control valve 220 is of the same construction as the control valve 200, including a pair of tank connections and a conduit 226 connected to charge pump (not shown), as is conduit 205, so as to provide operating fluid for operation of the displacement control for the motor swashplate.

Referring to the displacement control for the pump, the valve spool 201 is shown in FIG. 2B in a neutral position with the swashplate 32 also in neutral position. The position of the valve spool is partially controlled by a pivot arm 230, which is connected to the valve spool for movement with it, and which has a pair of springs 231 and 232 engaged against opposite sides of the arm 230 and acting in opposition to each other. The null position of the valve spool with the swashplate 32 in neutral is set by rotatable adjustment of a threaded seat member 233 for the spring 232, with the rotatable adjustment either advancing or retracting the spring seat 233 to vary the compression of the spring 232 in action against the spring 231 to obtain the desired null position. Additionally, the displacement control has feedback means including a pivot linkage 240 including an arm 241 on a fixed pivot 242 and having a seat at the upper end thereof for the spring 231. As the valve spool 201 is shifted, the control arm 230 is similarly shifted to create an imbalance in the springs 231 and 232. The shift of the spool in a pivoting of the swashplate 32, which is indicated through the feedback linkage to vary the compressive force on spring 231, so that when there is again a balance in the spring forces the valve spool 201 will be in a neutral flow-blocking position. This action will be the same regardless of the direction in which the swashplate 32 is pivoted.

As stated previously, the highest control pressure is always directed through conduits 222 to the valve 220 of the motor displacement control, whereby the pressure acts to shift the valve spool 221 toward the left as viewed in FIG. 2B. This valve spool has a control arm 250 movable therewith and with a pair of springs 251 and 252 engaged against opposite sides of the control arm and acting in opposition. The spring 251 has an adjustable, threaded spring seat member 253 on a fixed mounting in order to obtain a null position for the valve spool 221. Additionally, the spring 251 is stronger than the springs 231, 232 and 252, so that the valve spool 221 is normally positioned to connect conduit 226 to conduit 98 and will not shift in response to a control pressure until the value of that pressure exceeds a predetermined value. This control pressure is equal to the pressure that acts to substantially fully shift the valve spool 201 of the pump displacement control valve. This provides for staging in the operation of the components of the transmission whereby the swashplate 32 of the pump, which has been at neutral, will move to a substantially maximum displacement prior to any movement of the motor swashplate 33. Following maximum displacement of the pump swashplate, the displacement of the motor will be reduced as the control pressure increases.

This sequence of events is illustrated in the graph of FIG. 4 wherein the control pressure obtained by the setting of the pressure-reducing valve 125 of FIG. 2A is plotted as the ordinate and the displacement of the pump and motor are plotted as the abscissa. As the control pressure increases from (a) to (b), the displacement of the pump changes from neutral to maximum, as indicated by symbols beneath the abscissa line. Then at approximately the time the pump achieves full displacement, the displacement of the motor reduces progressively from a maximum to a minimum as the control pressure moves from value (*b*) to (*c*) as shown by markings on the abscissa.

The shuttle valve 210 has a valve spool 260 and a pair of internal passages opening to opposite ends thereof and extending to the surface of the valve spool by a pair of radial passages 261 and 262. The last-mentioned passages provide for communication of pressure in conduits 175 and 176 to the respective opposite ends of the shuttle valve spool 260, whereby the greater control pressure will act to shift the shuttle valve. Assuming that the greater control pressure is in conduit 175, the shuttle valve spool 260 will be shifted upwardly, whereby the conduit 175 is placed in communication with the conduit 222. If the greater control pressure is in conduit 175, this will be directed to the upper end of the shuttle valve spool, thus acting to shift the valve spool downwardly, with the result that conduit 176 will be placed in communication with conduit 222 leading to the control valve 220 of the motor displacement control. In either of the above situations, one or the other of the branch conduits 224 or 225 will be connected to the other non-pressurized conduits 175 or 176, thus providing a return flow path back to the steering control valve 171 and ultimately to the tank at the directional control valve 142.

In considering the feedback means of the motor displacement control, reference shall first be made to FIGS. 5 and 6. In order to maintain the same steer radius of a vehicle when changing ground speed while in a turn, there should be a linear relationship between the control pressure and the output speed of the transmission, as indicated in the graph of FIG. 5.

The feedback means for the motor displacement control has a cam to provide the relationship indicated by the graph of FIG. 6 between transmission speed and displacement of the motor in order to result in the linear relation between control pressure and transmisssion speed shown in the graph of FIG. 5. Without the cam, the relationship between pressure and speed shown in FIG. 5 would not be linear at the higher control pressures. This would result in an uncontrolled relation in a turn of the vehicle.

Referring specifically to the feedback means for the motor displacement control shown in FIG. 2B, a linkage connected to the swashplate has an arm 270 connected to the swashplate which, by a link 271, serves to pivot an arm 272, that is in turn pivotally connected to a fixed bracket 273, wherein the arm 272 includes a cam roller 274 secured to its upper end. A cam 275, pivoted on a fixed mount 276, carries a spring seat from the spring 252 and has a cam surface co-acting with the cam roller 274.

The action of the cam 275 results in obtaining a relatively small change in the compression of spring 252 when the displacement of the motor varies near the maximum displacement range of operation of the motor. There is a corresponding greater rate of change of compression of the spring 252 in response to a given control pressure signal when the motor is operating toward the minimal displacement range of operation. Thus, as the swashplate 33 pivots counterclockwise as viewed in FIG. 2B, the cam 275 also pivots counterclockwise to reduce the compression on the spring 252 until there is a balance obtained to bring the control spool 221 to a neutral position wherein operating fluid from conduit 226 is blocked from communication with the operating cylinders 94 and 95. This balance is obtained when the control pressure acting on the right-hand end of the control spool 221 plus the force of spring 252 equals the force of the stronger spring 251 and any force resulting from pressure acting against the left-hand end of the control spool 221.

It is apparent that the cam and cam roller relation shown in FIG. 2 could be reversed, whereby the cam could be associated with the feedback linkage and the follower associated with the spring seat.

A cam, such as cam 275, designed for a hydrostatic transmission using a single variable displacement motor with a variable displacement pump, provides the desired relation shown in FIG. 5 regardless of pump size or input speed. The only requirement is that the actual control pressure to produce full pump displacement be similar for different pump sizes. Similarly, the same cam can be used for different motor sizes as long as suitable feedback linkage is used in order to produce the relationship shown in FIG. 6.

To summarize briefly the operation of the control system of FIG. 1, a single control handle 100 controls components of the master control circuit to establish a uniform control pressure and, therefore, a uniform speed for both of the hydrostatic transmissions as well as the direction of operation thereof. With operation of the control handle 100 and rotation of the shaft 132, the control valve 142 is appropriately positioned and either of the cam surface sections 160 and 161 of the speed-setting cam 131 controls the force of the spring of the pressure-reducing valve 125. This applies the same control pressure to both branch circuits, with each circuit having a steering control valve, namely valves 171 and 173. When it is desired to obtain non-uniform operation of the transmissions, either of the handles 101 or 102 may be operated to vary the control pressures applied to the displacement controls for the associated hydrostatic transmission. The relation of rotation of the handle 100 to the establishment of control pressures by the pressure-reducing valve 125 is shown in the graph of FIG. 3 wherein the control pressure values (*a*), (*b*) and (*c*) correspond to those given in FIG. 4. It will be noted that initial rotation of the handle determines the direction of operation with the magnitude of rotation of the handle determining the control pressure and, therefore, the speed of the hydrostatic transmissions.

As described previously, the steering control valve 171 is shown in one limit position and, as the handle is moved, the valve spool 180 progressively is moved toward the other limit position. During this movement the spool meters part of the control pressure fluid to the tank, through a connection back to the directional control valve 142, with full movement of the steering control valve to an opposite limit position actually reversing the direction of control pressure fluid to the displacement controls.

When the steering control valve spool 180 is shifted to meter the control pressure, the pressure established in either of conduits 175 or 176 is connected to the tank by directional control valve 142 through the orifices 197 and 195, respectively, which serves to restrict flow of fluid to the tank. This establishment of pressure along with a reduction of the control pressure upsets the balance on the displacement control, resulting in that particular hydrostatic transmission operating at a reduced speed.

The steering control valve 173 has the output conduits 177 and 178, referred to previously, which correspond to the conduits 174 and 176 for the steering control valve 171. The conduits 177 and 178 connect into a displacement control, the same as shown in FIG. 2B for the pump and motor of the second hydrostatic transmission. Corresponding parts of the two steering control valves have been given the same reference numerals.

OPERATION OF THE ELECTRONIC TRACKING CONTROL

Figure 7:
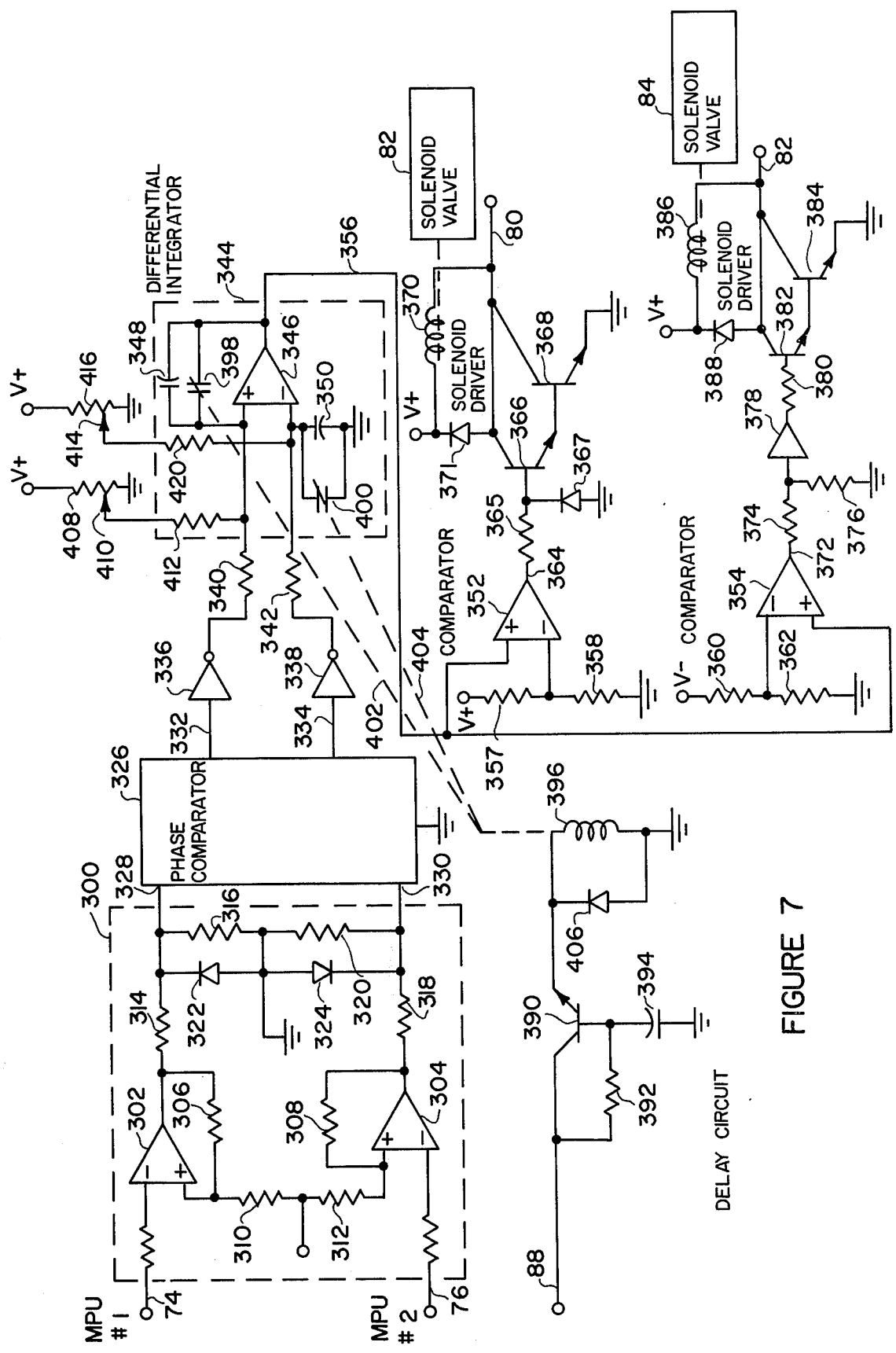
FIG. 7 is a schematic diagram of the electronic tracking control circuit of FIG. 1.

A schematic diagram of the electronic tracking control circuit represented by box 70 of FIG. 1 is provided in FIG. 7. As indicated previously, each output shaft 18 and 18' has associated therewith magnetic pick-up units 72 and 72', respectively. The magnetic pick-up units 72 and 72' respond to the rotation of the output shafts 18 and 18' by generating a series of pulses on lines 74 and 76 wherein the frequency of the pulses represent the rate of rotation of each of the shafts. As indicated in FIG. 7, the input signals of lines 74 and 76 are input to a buffer circuit indicated generally within the dashed lines 300. The buffering of the input signals provides the MPU's 72 and 72' with the correct or desired load impedance and in addition, provides proper voltage levels and transition times for the remainder of the electronic track control logic. The buffer circuitry includes two operational amplifiers, 302 and 304, which receive the input signals on lines 74 and 76 at their negative terminals. In addition to the feedback signals transmitted through resistors 306 and 308 in order to provide a hystersis loop for noise immunity, a positive voltage is applied to the positive terminals of the operational amplifiers 302 and 304 through the resistors 310 and 312. As a result, the desired square wave or pulses are transmitted from line 74 to a voltage divider composed of resistors 314 and 316 from amplifier 302 and similarly, the pulses on line 76 are transmitted through amplifier 304 to a voltage divider comprised of resistors 318 and 320. The output of each amplifier is also rectified into a pulse train of a single polarity by the diodes 322 and 324. Thus, the buffer amplifier circuit 300 provides a phase comparator 326 with input pulses of a single polarity and of the correct voltage amplitude on its input terminals 328 and 330.

Again, the pulse rate input to the terminals 328 and 330 represents the rate of rotation of each of the motor shafts 18 and 18'. The phase comparator circuit 326 can be one of any of a number of commercially available circuits such as the Motorola phase comparator part number MC4544. Associated with the phase comparator 326 are two output lines, 332 and 334. As is conventional, the phase comparator 326 responds to a greater pulse rate input on input terminal 328 by generating a pulse train on output terminal 328 and similarly, if the pulse rate on the other input terminal 330 is greater than the pulse rate on input terminal 328, a pulse train is generated on output line 334. The signals generated on the phase comparator output lines 332 and 334 will be proportional to the difference in rates of the input pulses to the phase comparator 326. As a result, when the motor shaft 18 is turning at a greater rate than the motor shaft 18', the phase comparator 326 will generate a pulse train on output line 332, with no signal being generated on line 334.

Signals on lines 332 and 334 are in turn inverted by a pair of inverter circuits 336 and 338 prior to being used as input, through resistors 340 and 342, to a differential integrator circuit indicated generally by the dashed line 344. Included in the differential integrator is an operational amplifier 346 having a capacitor 348 connected in a feedback loop to the negative input terminal. Another capacitor 350 is connected between the positive terminal of the operational amplifier 346 and ground. The values of the two capacitors 348 and 350 control the time constant of the differential integrator 344. The primary function of the differential integrator 344 is to generate an electrical signal that represents the faster moving track in polarity with an amplitude which is proportional to the difference in speed of the two tracks taken over time.

A pair of comparator circuits 352 and 354 respond to the output on line 356 of the differential integrator 344. The first comparator, 352, receives the output from the differential integrator 344 at its positive terminal, and the second comparator, 354, receives the output at its positive terminal. Comparator 352 also has a positive reference voltage applied through a voltage divider, composed of the resistors 357 and 358, to its negative terminal and by the same token, the second comparator, 354, has a negative reference voltage applied to its positive terminal through a voltage divider composed of the resistors 360 and 362. Thus, when the output of the differential integrator 344 is positive and exceeds the positive reference voltage applied to the negative terminal of comparator 352, the comparator will change state and apply a positive voltage on line 364. The positive voltage on line 364 establishes bias current to transistors 366 and 368 through resistor 365, while diode 367 limits the voltage to transistors 366 and 368 to one diode voltage drop when line 364 goes negative. A positive voltage on line 364 will have the effect of activating the solenoid driver for the solenoid valve 82 by switching on the transistors 366 and 368. When the transistors 366 and 368 are on, current will flow through the relay coil 370 to ground, thereby serving to activate the solenoid valve 82. A diode 371 is connected between the voltage source in the solenoid driver and the transistors 366 and 368 in order to provide a current path so as to prevent damage to the circuit from the inductive voltage generated in the coil 370 when the transistors 366 and 368 are switched off. The second comparator, 354, on the other hand, responds to a negative output of the differential integrator 344, when it is more negative than the negative reference voltage being applied to its positive terminal, by generating a positive voltage on line 372. The positive voltage is reduced by the voltage divider composed of resistors 374 and 376 before being input to an inverter, 378. Inverter 378 effectively reverses the reduced negative voltage on line 372 into a positive voltage which, when applied through resistor 380 to transistors 382 and 384, of the second solenoid driver, is effective to activate the solenoid valve 84. As with the other comparator, 352, switching on of transistors 382 and 384 permits current to flow from the voltage source through the relay coil 386 to ground, thereby activating the solenoid valve. Again, as with the other comparator, a diode 388 is inserted into the solenoid driver circuit in order to provide a current path so that the voltage generated by the inductive coil 386 will not damage the circuit when the transistors 382 and 384 are switched off. It should be noted at this point that the response of the track control circuit can be adjusted by either adjusting the time constant of the differential integrator 341, i.e. by altering the values of capacitors 348 and 350; or by adjusting the reference voltages applied to the comparators 352 or 354. As a general rule, the shorter the time constant or the more sensitive the comparators, that is, the smaller the difference in relative speed between the vehicle's tracks needed to activate one or the other of the solenoid valves, the less the vehicle will tend to "wobble" from side to side. By taking into account the nature of the vehicle's hydrostatic equipment and its intended use, the track control circuit can be adjusted to minimize the undesired wobble.

Also included in the electronic track control circuit of FIG. 7 is a transistor delay circuit which responds to signals from the steering valves 171 and 173 as received on line 88. This circuit is provided in order to permit the deactivation of the electronic track control during the time either of the steering valves is being utilized by an operator. The time delay is provided in order to allow the vehicle to travel in a straight path for a short period of time so as to establish a trend before the track control is enabled. In particular, each of the steering control valves 171 and 173 of FIG. 2A contains a switch 198 and 198' of FIG. 2A which is closed only when the steering control valve is in a neutral position. When this is the case, a positive voltage signal is transmitted on line 88 to the base of a transistor 390. The placing of the transistor 390 in a current conducting state is delayed by a resistor 392 in combination with a capacitor 394 that are connected as an RC circuit across the collector and base of the transistor 390. As the transistor 390 is switched on, the relay coil 396 is activated, which in turn opens the relay contacts 398 and 400 that are connected in parallel with the capacitors 348 and 350, respectively, of the differential integrator 344. This operative relationship is indicated by the dashed lines 402 and 404. It is, of course, the function of the relay contacts 398 and 400 to remove the charge, or clamp, the differential integrator when either of the steering control valves is being utilized. When the relay contacts are closed, there will be no output from the differential integrator 344 on line 356, thereby preventing the operaion of either the solenoid valves 82 or 84. In addition, the delay circuit includes a diode 406 which provides a current path for the inductive relay coil 396 in order to protect the delay circuit when the transistor 390 is switched off.

A curved path or track of operation of the vehicle can be programmed by the application of bias voltages to either the positive or negative input terminals of the integrator amplifier 346. For example, the desired bias voltage can be applied to the negative terminal of amplifier 346 by using a positive voltage source connected to ground through resistor 408. The precise bias voltage can be regulated by picking off, by means of the wiper arm 410, the desired bias voltage from resistor 408 and transmitting it through resistor 412 to the negative terminal of amplifier 346. By the same token, a desired bias voltage can be applied to the positive terminal of amplifer 346 by means of a wiper arm 414 selecting the desired voltage from a resistor 416 and transmitting it through resistor 420. Thus, by selecting the correct bias voltages by adjusting the wiper arms 410 and 414, an operator can program the vehicle in a path of operation with a predetermined radius or curve.

The preferred embodiment of the invention has been discussed within the environment of a vehicle having two tracks driven by individual hydrostatic transmissions as illustrated in FIG. 1. However, it will be appreciated that the basic principles of electronically comparing the speed of tracks or wheels which are driven by a hydrostatic system wherein the operation of one or another of the hydrostatic transmissions is modified by a solenoid valve, or like means, is applicable to a variety of hydrostatic control systems and a variety of vehicles from crawler tracktors to paving machines, where straight line or a predetermined curve path of operation is a desirable objective.

I claim:

1. An electronic tracking control for use in vehicles where power is applied to the tracks or wheels through a plurality of hydrostatic transmissions comprising:
   means for regulating the speed output of each hydrostatic transmission;
   means for generating electrical pulse signals representing the speed output of each hydrostatic transmission;
   an electronic circuit for comparing the phases of each of said electrical pulse signals and generating a phase difference signal representing the difference in the speed of each hydrostatic transmission;
   electronic control means, responsive to said phase difference signal, for causing one of said speed regulating means to reduce the speed of its associated hydrostatic tranmission thereby facilitating operation of the vehicle in a desired path of operation.

2. The tracking control of claim 1 wherein said speed regulating means includes solenoid actuated valves, responsive to said electronic control means, for altering the speed output of the hydrostatic transmission.

3. The tracking control of claim 2 wherein said speed signal generating means includes a magnetic pick-up unit associated with each hydrostatic transmission for generating said series of electrical pulses that represent the speed output of its associated transmission.

4. The tracking control of claim 2 wherein said electronic circuit additionally includes an integrating circuit operatively connected to said phase comparison circuit for integrating said phase difference signal over time.

5. The tracking control of claim 4 additionally including means for applying a bias voltage to said integrating circuit, said bias voltage being effective to alter the operation of said integrating circuit thereby providing for a curved path of operation for the vehicle.

6. The tracking control of claim 4 wherein said electronic control means includes a comparator circuit operatively connected to said integrating circuit.

7. The tracking control of claim 6 wherein said electronic control circuit additionally includes a solenoid driver circuit operatively connected to each of said solenoid actuated valves and operatively conected to said comparator circuit.

8. The tracking control of claim 7 wherein said comparator circuit includes an operational amplifier comparator circuit operatively connected to each of said solenoid driver circuits and responsive to the polarity and amplitude of the output signal from said integrating circuit to activate the solenoid driver circuit associated with the transmission having an excessive speed output.

9. The tracking control of claim 4 wherein said integrating circuit includes means for inhibiting the output of said integrating circuit in response to signals from said speed regulating means indicating that manual direction is desired.

10. The tracking control of claim 9 wherein said inhibiting means additionally includes means for delaying the operation of said integrating circuit a predetermined amount of time after a signal from said speed regulating means indicated that straight line operation is desired.

11. An electronic tracking control circuit for use in a vehicle having a hydrostatic transmission associated with each wheel or track for delivering power from a prime mover to the wheel or track wherein each hydrostatic transmission includes a hydraulic pump and motor along with transmission control means for controlling the output of the pump and motor in response to hydraulic speed, direction and manual steering command signals, wherein the electronic tracking control circuit includes:

means for generating an electrical signal representing the speed of each hydraulic motor;

an electronic circuit for comparing said electrical speed signals and generating an electrical signal representing the difference in speed of each hydraulic motor;

regulating means operatively associated with each of the transmission control means for regulating the speed of each motor in response to an electrical speed regulating signal;

electronic control means, responsive to said difference signal, for generating and transmitting said electrical speed regulating signal to one of said regulating means, thereby facilitating operation of the vehicle in a desired path of operation; and delay means, responsive to the transmission control means, for delaying the operation of said electronic control means a predetermined amount of time after manual steering command signals have terminated.

12. The tracking control circuit of claim 11 wherein said electronic circuit for comparing said electrical speed signals includes a phase comparison circuit effective to generate a phase difference signal.

13. The tracking control circuit of claim 12 wherein said electronic control means includes:
a differential integrator circuit operatively connected to said phase comparison circuit and effective to integrate said phase difference signal over time; and
a comparator circuit operatively connected to said differential integrator circuit for generating said electrical speed regulating signal.

14. The tracking control circuit of claim 13 additionally including means for applying bias voltages to said differential integrator circuit, said bias voltages being effective to alter the operation of said differential integrator circuit, thereby providing for a curved path of operation for the vehicle.

15. The tracking control circuit of claim 14 wherein said regulating means includes solenoid actuated valves, responsive to said speed regulating signals, for altering the speed output of its associated motor.

16. The tracking control circuit of claim 15 wherein said electronic control means additionally includes a solenoid driver circuit operatively connected to each of said solenoid actuated valves and responsive to said comparator circuit.

17. The tracking control circuit of claim 16 wherein said comparator circuit includes an operational amplifier comparator circuit operatively connected to each of said solenoid driver circuits and responsive to the polarity and amplitude of the output signal from said differential integrator, thereby being effective to actuate the solenoid driver associated with the motor turning at an excessive speed.

18. The tracking control circuit of claim 17 wherein said delay means includes means for inhibiting the output of said differential integrator in response to the manual steering command signals.

19. The tracking control circuit of claim 18 wherein said delay means additionally includes:
a transistor delay circuit comprised of a resistor and a capacitor connected between the collector and base of a transistor; and
a relay, responsive to said transistor, effective to clamp said differential integrator to inhibit its output.

20. The tracking control circuit of claim 19 wherein said means for generating an electrical signal representing the speed of each motor includes a magnetic pickup unit associated with each motor for generating a series of electrical pulses that represent the speed output of its associated motor.

21. In a vehicle having a hydrostatic transmission associated with each wheel or track for delivering power from a prime mover wherein each hydrostatic transmission includes a hydraulic pump and motor controlled by a hydraulic control system which includes: a displacement control unit for controlling the displacement and operation of each pump and motor; a speed and direction control unit for controlling the displacement control units; and steering valves interposed between the speed and direction control unit and each displacement control unit for manually altering the speed output of each transmission individually, wherein the improvement comprises:

means for generating an electrical signal representing the speed of each motor;
an electronic circuit for comparing said electrical speed signals and generating an electrical signal representing the difference in speed of each motor;
valve means, interposed in the hydraulic circuit between the speed and direction control units and each of the displacement control units, for regulating the speed of each motor; and
an electronic control circuit responsive to said difference signal, effective to control each of said valve means, thereby facilitating the operation of the vehicle along a desired path of operation.

22. The system of claim 21 wherein said electronic control circuit includes an integrating circuit operatively connected to said electronic circuit for comparing each of said speed signals, and effective to integrate said difference signal over time; and
a comparator circuit operatively connected to said integrator circuit.

23. The system of claim 22 wherein said electronic circuit for comparing said speed signals includes a phase comparison circuit effective to generate a phase difference signal for input to said integrating circuit.

24. The system of claim 23 wherein said valve means includes solenoid actuated valves.

25. The system of claim 24 wherein said electronic control means additionally includes a solenoid driver circuit operatively connected to each of said solenoid actuated valves and responsive to said comparator circuit.

26. The system of claim 25 wherein said comparator circuit includes an operational amplifier comparator circuit operatively connected to each of said solenoid driver circuits and responsive to the polarity and amplitude of the output signal from said integrator, thereby being effective to actuate the solenoid driver associated with the motor turning at an excessive speed.

27. The system of claim 26 wherein said electronic control circuit includes means, responsive to a signal from the steering valves, for inhibiting the operation of said electronic control circuit when the steering valves are being operated.

28. The system of claim 27 wherein each of the steering control valves includes a switch wherein each of said switches is electrically connected in series with said inhibit means.

29. The system of claim 28 wherein said inhibit means includes a delay circuit for delaying the discontinuing of the operation of said inhibit means a predetermined time after each of said switches are closed thereby indicating that the valves are not being operated.

30. The system of claim 29 wherein said inhibit means includes a circuit for inhibiting the output of said integrating circuit in response to the opening of one or more of said switches indicating that the valve is being operated.

31. The system of claim 30 wherein said delay circuit includes:
   a transistor delay circuit comprised of a resistor and a capacitor connected between the collector and the base of a transistor; and
   a relay, responsive to said transistor, effective to clamp said integrator to inhibit its output.

32. The system of claim 31 wherein said means for generating an electrical signal representing the speed of each motor includes a magnetic pick-up unit associated with each motor for generating a series of electrical pulses that represent the speed of the motor.

33. An electronic circuit, for use in a vehicle having hydrostatic transmissions and a hydraulic control system wherein said electronic circuit facilitates a straight line operation of the vehicle without operator intervention, comprising:
   means for generating an electrical signal representing the speed of each transmission;
   phase comparator means for comparing the phase of each of said electronic speed signals and generating a difference signal;
   an electronic control circuit responsive to said difference signal, effective to generate a control signal when the speed of one transmission exceeds the speed of the other transmission; and
   means operatively connected to the hydraulic control system and responsive to said control signal effective to slow the faster moving transmission in order to facilitate straight line operation.

34. The circuit of claim 33 wherein said speed signal generating means includes a magnetic pick-up unit associated with each transmission for generating a series of pulses that represents the speed of the transmission.

35. The circuit of claim 34 wherein said comparator means includes:
   a buffer circuit for receiving and conditioning said series of pulses from said magnetic pick-up unit; and
   a phase comparator circuit operatively connected to said buffer effective to generate said difference signal.

36. The circuit of claim 35 wherein said electronic control circuit includes:
   a differential integrator circuit operatively connected to said phase comparison circuit and effective to integrate said difference signal over time;
   a comparator circuit, further comprised of two operational amplifiers, operatively connected to said differential integrating circuit and responsive to the polarity and amplitude of the output of said differential integrator circuit;
   a solenoid driver circuit operatively connected to each of said operational amplifiers.

37. The circuit of claim 36 wherein said electronic control circuit additionally includes:
   a delay circuit which includes a resistor and a capacitor connected across the collector and base of a transistor and is responsive to signals from the hydraulic control system indicating straight line operation without operator intervention; and
   a relay circuit, responsive to said transistor, effective to inhibit the output of said differential integrator circuit.

38. The circuit of claim 37 wherein said means for slowing the faster moving transmissor includes a solenoid actuated valve responsive to said solenoid driver circuits.

39. An electronic tracking control for use in vehicles where power is applied to the tracks or wheels through a plurality of hydrostatic transmissions comprising:
   means for regulating the speed output of each hydrostatic transmission;
   means for generating electrical pulse signals representing the speed of each hydrostatic transmission;
   an electronic circuit including a phase comparison circuit, responsive to said pulse signals effective to generate a phase difference signal, and an integrating circuit operatively connected to said phase comparison circuit for integrating said phase difference signal over time; and
   electronic control means, responsive to the output of said integrating circuit, for causing one of said speed regulating means to reduce the speed of its associated hydrostatic transmission thereby facilitating operation of the vehicle in a desired path of operation.

40. An electronic tracking control circuit for use in a vehicle having a hydrostatic transmission associated with each wheel or track for delivering power from a prime mover to the wheel of the track wherein each hydrostatic transmission includes a hydraulic pump and motor along with transmission control means for controlling the output of the pump and motor in response to hydraulic speed, direction and manual steering command signals, wherein the electronic tracking control circuit includes:
   means for generating an electrical signal representing the speed of each hydraulic motor;
   an electronic circuit including a phase comparison circuit effective to generate a phase difference signal representing the difference in phase of said speed signals;
   regulating means operatively associated with each of the transmission control means for regulating the speed of each motor in response to an electrical speed regulating signal;
   electronic control circuit including a differential integrator circuit operatively connected to said phase comparison circuit and effective to integrate said phase difference signal over time and a comparator circuit operatively connected to said differential integrator circuit for generating said electrical speed regulating signal; and delay means, responsive to the transmission control means, for delaying the operation of said electronic control means a predetermined amount of time after manual steering command signals have terminated.

41. In a vehicle having a hydrostatic transmission associated with each wheel or track for delivering power from a prime mover wherein each hydrostatic transmission includes a hydraulic pump and motor controlled by a hydraulic control system which includes: a displacement control unit for controlling the displacement and operation of each pump and motor; a speed and direction control unit for controlling the displacement control units; and steering valves interposed between the speed and direction control unit and each displacement control unit for manually altering the speed output of each transmission individually, wherein the improvement comprises:

means for generating an electrical signal representing the speed of each motor;

an electronic circuit for comparing said electrical speed signals and generating an electrical signal representing the difference in speed of each motor;

valve means, interposed in the hydraulic circuit between the speed and direction control unit and each of the displacement control units, for regulating the speed of each motor; and an electronic control circuit responsive to said difference signal, including an integrating circuit operatively connected to said electronic circuit effective to integrate said difference signal over time and a comparator circuit operatively connected to said integrator circuit, effective to control each of said valve means, thereby facilitating the operation of the vehicle along a desired path of operation.

42. An electronic circuit, for use in a vehicle having hydrostatic transmissions and a hydraulic control system wherein said electronic circuit facilitates straight line operation of the vehicle without operator intervention, comprising:

means including a magnetic pick-up unit associated with each transmission for generating an electrical pulse signal representing the speed of each transmission;

comparator means including a buffer circuit for receiving and conditioning said series of pulses from said magnetic pick-up unit and a phase comparator circuit operatively connected to said buffer circuit effective to generate a difference signal;

an electronic control circuit responsive to said difference signal, effective to generate a control signal when the speed of one transmission exceeds the speed of the other transmission; and means operatively connected to the hydraulic control system and responsive to said control signal effective to slow the faster moving transmission in order to facilitate straight line operation.

* * * * *